US010462482B2

(12) United States Patent
Mukherjee et al.

(10) Patent No.: US 10,462,482 B2
(45) Date of Patent: Oct. 29, 2019

(54) MULTI-REFERENCE COMPOUND PREDICTION OF A BLOCK USING A MASK MODE

(71) Applicant: GOOGLE LLC, Mountain View, CA (US)

(72) Inventors: Debargha Mukherjee, Cupertino, CA (US); Yaowu Xu, Saratoga, CA (US); James Bankoski, Los Gatos, CA (US); Yuxin Liu, Palo Alto, CA (US)

(73) Assignee: GOOGLE LLC, Mountain View, CA (US)

(*) Notice: Subject to any disclaimer, the term of this patent is extended or adjusted under 35 U.S.C. 154(b) by 120 days.

(21) Appl. No.: 15/420,359

(22) Filed: Jan. 31, 2017

(65) Prior Publication Data

US 2018/0220152 A1 Aug. 2, 2018

(51) Int. Cl.
| | | |
|---|---|---|
| *H04N 7/12* | (2006.01) | |
| *H04N 19/573* | (2014.01) | |
| *H04N 19/132* | (2014.01) | |
| *H04N 19/56* | (2014.01) | |
| *H04N 19/176* | (2014.01) | |
| *H04N 19/119* | (2014.01) | |
| *H04N 19/20* | (2014.01) | |

(Continued)

(52) U.S. Cl.
CPC ......... *H04N 19/573* (2014.11); *H04N 19/119* (2014.11); *H04N 19/132* (2014.11); *H04N 19/176* (2014.11); *H04N 19/20* (2014.11); *H04N 19/56* (2014.11); *H04N 19/577* (2014.11); *H04N 19/58* (2014.11)

(58) Field of Classification Search
CPC .. H04N 19/119; H04N 19/132; H04N 19/176; H04N 19/20; H04N 19/56; H04N 19/573; H04N 19/577; H04N 19/58
See application file for complete search history.

(56) References Cited

U.S. PATENT DOCUMENTS

| 5,764,814 A | 6/1998 | Chen et al. |
| 6,037,988 A | 3/2000 | Gu et al. |

(Continued)

FOREIGN PATENT DOCUMENTS

| WO | 2011134642 A1 | 11/2011 |
| WO | WO-2016074746 A1 | 5/2016 |

OTHER PUBLICATIONS

Manoranjan, Paul; "Efficient H.264/AVC video encode where Pattern is used as Extra Mode for Wide Range of video coding" Jan. 9, 2007 (Jan. 9, 2007) p. 353-362 (Year: 2007).*

(Continued)

*Primary Examiner* — Jessica M Prince
(74) *Attorney, Agent, or Firm* — Young Basile Hanlon & MacFarlane, P.C.

(57) ABSTRACT

Multi-reference compound prediction using masking for encoding and decoding blocks of video frames is described. A mask for segmenting a current block of a current frame of the video sequence into at least a first segment and a second segment is determined using a first set of reference frames. A first predictor using the first set of reference frames is generated for the first segment of the current block. A second predictor is generated for the second segment of the current block using a second set of reference frames, wherein the first set of reference frames is a subset of the second set of reference frames.

16 Claims, 8 Drawing Sheets

(51) Int. Cl.
   *H04N 19/58*   (2014.01)
   *H04N 19/577*  (2014.01)

(56) References Cited

U.S. PATENT DOCUMENTS

| | | | |
|---|---|---|---|
| 6,212,235 | B1 | 4/2001 | Nieweglowski et al. |
| 6,711,211 | B1 | 3/2004 | Lainema |
| 7,039,232 | B2 | 5/2006 | Nagarajan et al. |
| 7,813,429 | B2 | 10/2010 | Winger |
| 9,531,990 | B1* | 12/2016 | Wilkins .................. H04N 7/00 |
| 9,986,236 | B1* | 5/2018 | Mukherjee ........... H04N 19/105 |
| 2004/0008784 | A1* | 1/2004 | Kikuchi ............... H04N 19/573 375/240.16 |
| 2011/0200097 | A1* | 8/2011 | Chen ..................... H04N 19/52 375/240.02 |
| 2017/0223357 | A1* | 8/2017 | Bankoski ............. H04N 19/105 |

OTHER PUBLICATIONS

Manoranjan Paul et al: "Residual Coding for H.264 Encoder", Information Technology, 2007 Fourth International Conference on IEEE, Apr. 1, 2007 pp. 214-218 (Year: 2007).*

Bankoski, et al., "Technical Overview of VP8, An Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

International Search Report and Written Opinion for International Patent Application No. PCT/US2017/059225; dated May 11, 2018.

Manoranjan Paul et al: "Residual Coding for H.264 Encoder", Information Technology, 2007; Fourth International Conference on, IEEE, Apr. 1, 2007, pp. 214-218.

Manoranjan Paul et al: "Efficient H.264/AVC Video Encoder Where Pattern Is Used as Extra Mode for Wide Range of Video Coding", Jan. 9, 20-07; pp. 353-362.

Kwok-Wai Wong et al: "Bit-Rate Video-Coding Algorithm Focusing on Moving Regions"; IEEE Transactions on Circuits and Systems for Video Technology, Institute of Electrical and Electronics Engineers, Oct. 1, 2001; pp. 1128-1134.

Jae H00n Kim et al: "Motion Compensation based on implicit block segmentation", 15th IEEE International Conference on Image Processing : ICIP 2008 ; San Diego, CA, Oct. 12, 2008, pp. 2452-2455.

Jain Richardson: "H.264 and MPEG-4 Video Compression, Video Coding for Next-generation Multimedia" In: "H.264 and MPEG-4 Video Compression, Video Coding for Next-generation Multimedia" Jan. 1, 2003, pp. 159-223.

Takahiro Fukuhara et al:"Bit-Rate Video Coding with Block Partitioning and Adaptive Selection of TwoTime-Differential Frame Memories", IEEE Transactions on Circuits and Systems for Video Technology, Institute of Electrical and Electronics Engineers, Feb. 1, 1997; pp. 212-220.

Jianle Chen et al: "Object Boundary Based Motion Partition for Video Coding", 26. Picture Coding Sympos; Nov. 7, 2011; pp. 1-4.

* cited by examiner

MULTI-REFERENCE COMPOUND PREDICTION OF A BLOCK USING A MASK MODE

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

SUMMARY

The disclosure relates in general to video coding and in particular to multi-reference compound prediction using masking for encoding and decoding blocks of video frames.

One aspect of the disclosed implementations is a method for encoding frames of a video sequence. The method includes determining, using a first set of reference frames, a mask for segmenting a current block of a current frame of the video sequence into at least a first segment and a second segment; generating, for the first segment of the current block, a first predictor using the first set of reference frames; and generating, for the second segment of the current block, a second predictor using a second set of reference frames, wherein the first set of reference frames is a subset of the second set of reference frames.

Another aspect of the disclosed implementations is a method for decoding frames of a video sequence from an encoded video bitstream. The method includes determining, using a first set of reference frames, a mask for segmenting a current block of a current frame of the video sequence into at least a first segment and a second segment; generating, for the first segment of the current block, a first predictor using the first set of reference frames; and generating, for the second segment of the current block, a second predictor using a second set of reference frames, wherein the first set of reference frames is a subset of the second set of reference frames.

Another aspect of the disclosed implementations is an apparatus including a non-transitory memory and a processor. The apparatus can be used for decoding frames of a video sequence from an encoded video bitstream. The processor is configured to execute instructions stored in the memory to determine, using a first set of reference frames, a mask for segmenting a current block of a current frame of the video sequence into at least a first segment and a second segment; generate, for the first segment of the current block, a first predictor using the first set of reference frames; and generate, for the second segment of the current block, a second predictor using a second set of reference frames, wherein the first set of reference frames is a subset of the second set of reference frames.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

DETAILED DESCRIPTION

Compression schemes related to coding video streams may include breaking each image into blocks and generating a digital video output bitstream using one or more techniques to limit the information included in the output. A received bitstream can be decoded to re-create the blocks and the source images from the limited information. Encoding a video stream, or a portion thereof, such as a frame or a block, can include using temporal and spatial similarities in the video stream to improve coding efficiency. For example, a current block of a video stream may be encoded based on a previously encoded block in the video stream by predicting motion and color information for the current block based on the previously encoded block and identifying a difference (residual) between the predicted values and the current block. Inter-prediction, for example, uses one or more motion vectors to generate a block (also called a prediction block) that resembles a current block to be encoded using previously encoded and decoded pixels. By encoding the motion vector(s), and the difference between the two blocks, a decoder receiving the encoded signal can re-create the current block.

A motion vector used to generate a prediction block refers to a frame other than a current frame, i.e., a reference frame. Reference frames can be located before or after the current frame in the sequence of the video stream. A block may be predicted from a single reference frame ("single prediction") or compound, such as two, reference frames ("compound prediction"). For example, a motion search that attempts each of the available inter-prediction modes using single or compound modes can be performed. In the case of compound prediction, a predictor (e.g., a prediction block) can be formed for each of the multiple reference frames, and a combination, such as an average (or weighted average) of the predictors can be used to predict the block.

The teachings herein describe, among other things, compound prediction from multiple reference frames using masking. A compound prediction using masking (also referred to as "masked compound prediction") is a special type of compound prediction, where a mask is used to segment the current block into segments. For example, the current block can be segmented into a "foreground" segment and a "background" segment, based on motion characteristics. Each segment can be inter-predicted and encoded using different reference frames and motion vector combinations. It is also possible to use inter-prediction and intra-prediction for different segments within the same block.

A mask for segmenting a block can be determined, using a first set of reference frames, such as a pair of a forward reference frame and a backward reference frame selected from a set of candidate reference frames available to a current frame. The first set of reference frames can be determined by ranking the candidate reference frames based on, for example, distances to the current frame (e.g., "nearest"), popularity values or a combination of distances and popularity values.

The mask can be determined for the block adaptively, for example, based on motion characteristics of the video content, such as by comparing two prediction blocks based on the pair of reference frames, and setting a threshold on the absolute difference values between the two prediction blocks. The mask can also be determined using a mask codebook, which includes predetermined block segmentation patterns. A special coding mode, such as a mask mode, can be encoded into the block header without having to encode the mask itself.

To further reduce overhead, the first set of reference frames, which have been used to determine the mask, can be reused to predict one or more segments determined by the mask. For example, a compound predictor for a "background" segment can be determined by averaging the predictors from the pair of reference frames. As mentioned, the first set of reference frames does not need to be explicitly encoded. Reusing the first set of reference frames for predicting one or more segments can further reduce the bits coded into the video bitstream.

For a second segment, such as a "foreground" segment, a third (or even a fourth) reference frame and a new motion vector can be searched for and used for inter prediction. By using different sets of reference frames (and predictors) for different segments, the masked compound prediction adapts to the motion characteristic of the video content in the current block. The second segment can be predicted using single prediction, or compound prediction, or intra-prediction, based on results of the motion search. Other details are described herein first with reference to a system in which the teachings may be incorporated.

Figure 1:
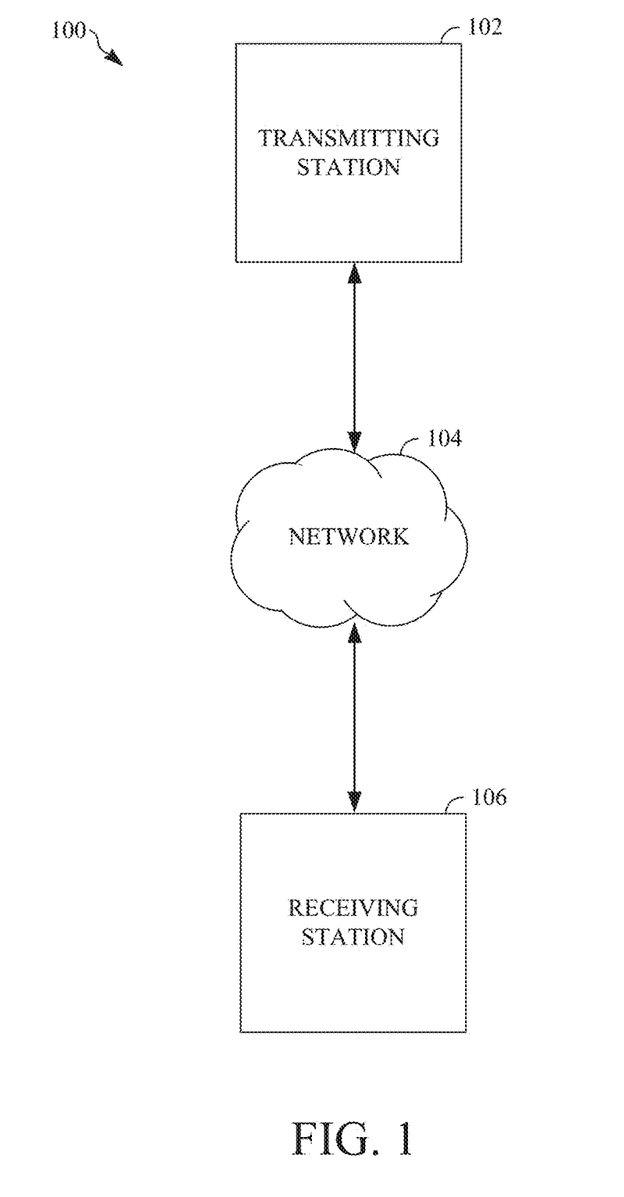
FIG. 1 is a schematic of a video encoding and decoding system.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
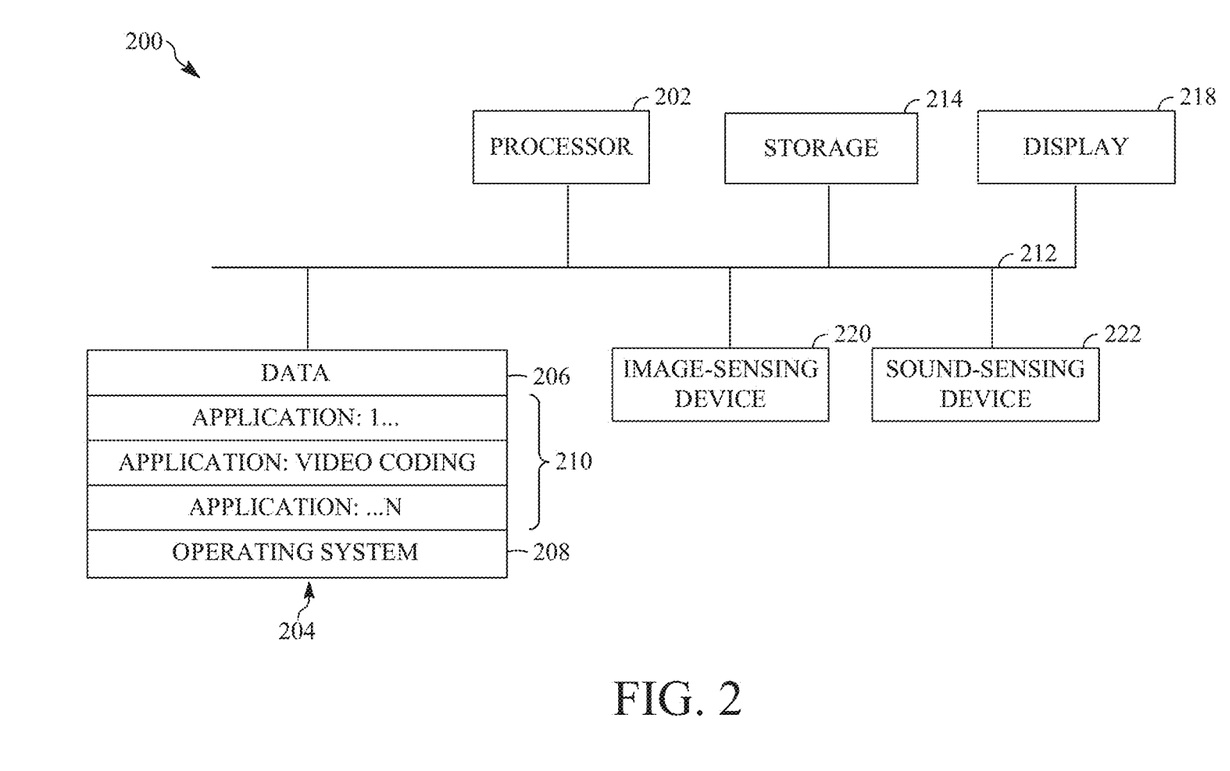
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., an HTTP-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
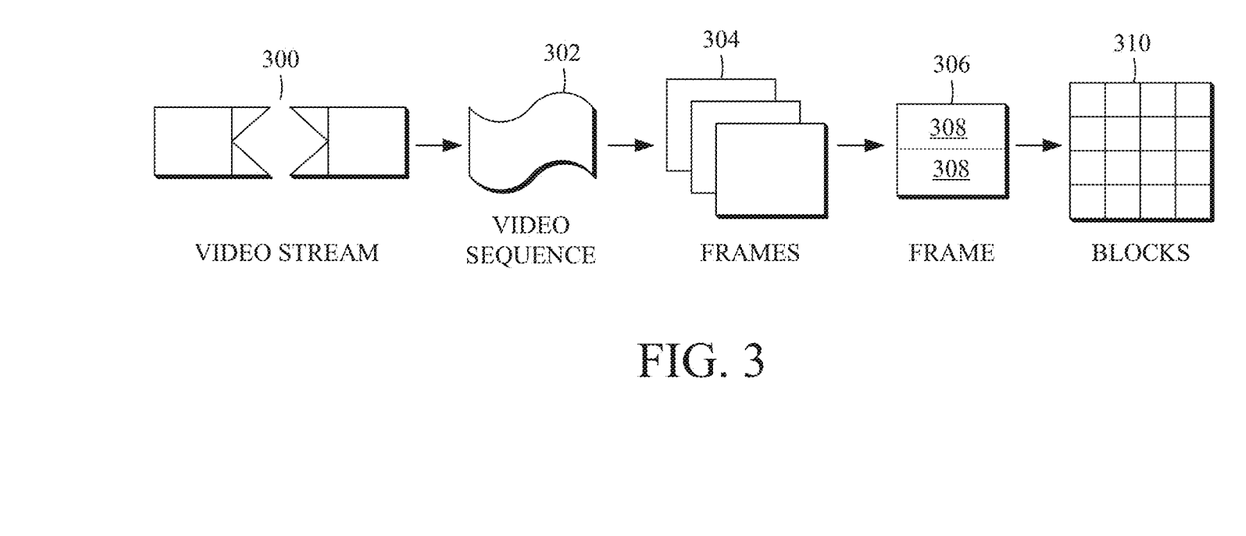
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger. Unless otherwise noted, the terms block and macroblock are used interchangeably herein.

Figure 4:
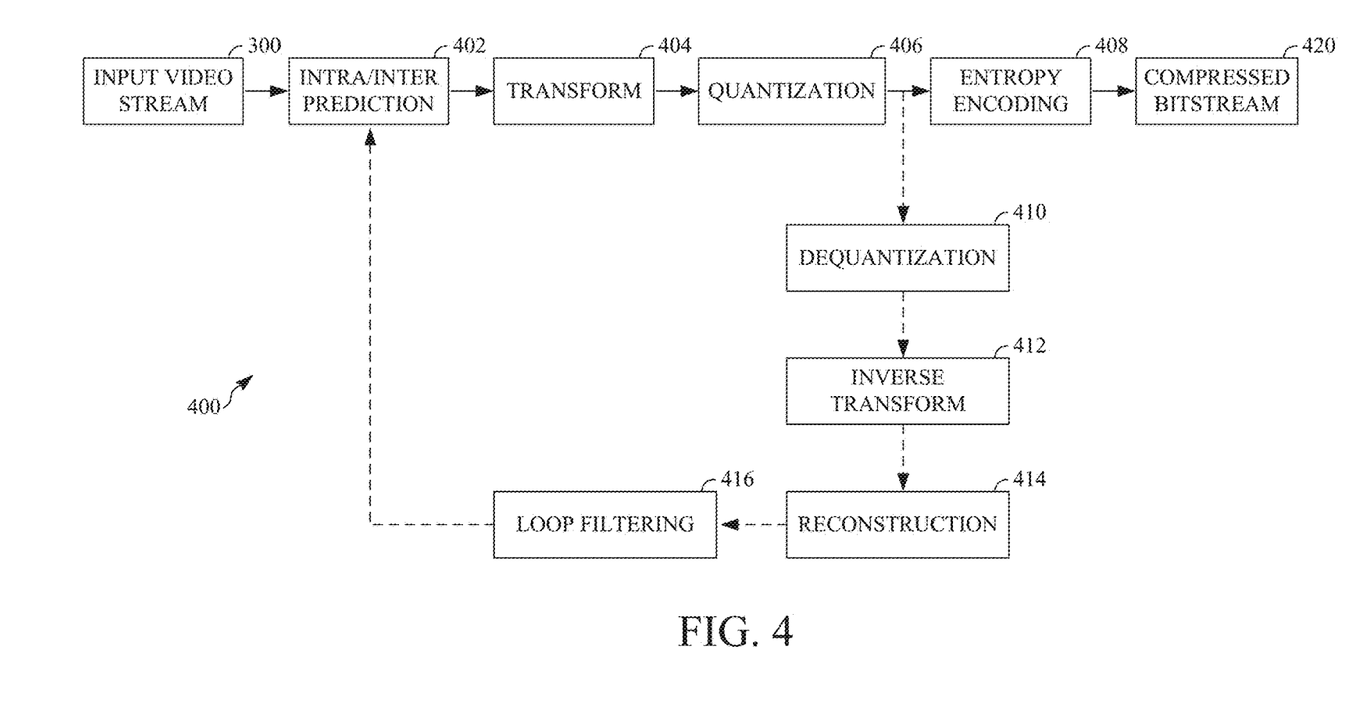
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. For example, the encoder 400 can be a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Implementations for masked compound prediction from multiple reference frames are discussed below with respect to FIGS. 6, 7, 8A, and 8B. For inter-prediction, blocks may be predicted from a single reference frame ("single prediction") or compound, such as two, reference frames ("compound prediction"). Various inter-prediction modes may be tested. For example, a motion search that attempts each of the available inter-prediction modes using single or compound modes can be used. In the case of compound prediction, two or more motion vectors can be obtained through a joint search between two or more reference frames. For each proposed motion vector(s) and for each tested inter-prediction mode, a bit cost of encoding the current block using the inter-prediction mode, including the bits required to signal the inter-prediction mode, the reference frame(s), the residual block generated from the current block, and, if required, one or more motion vector(s) or motion vector differential(s), and the resulting error in the pixel values between the original values and the reconstructed values are calculated. The inter-prediction mode and reference frame(s) resulting in the lowest rate-distortion value may be selected as the inter-prediction mode for the current block.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient is located at the top-left of the matrix and the highest frequency coefficient is located at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
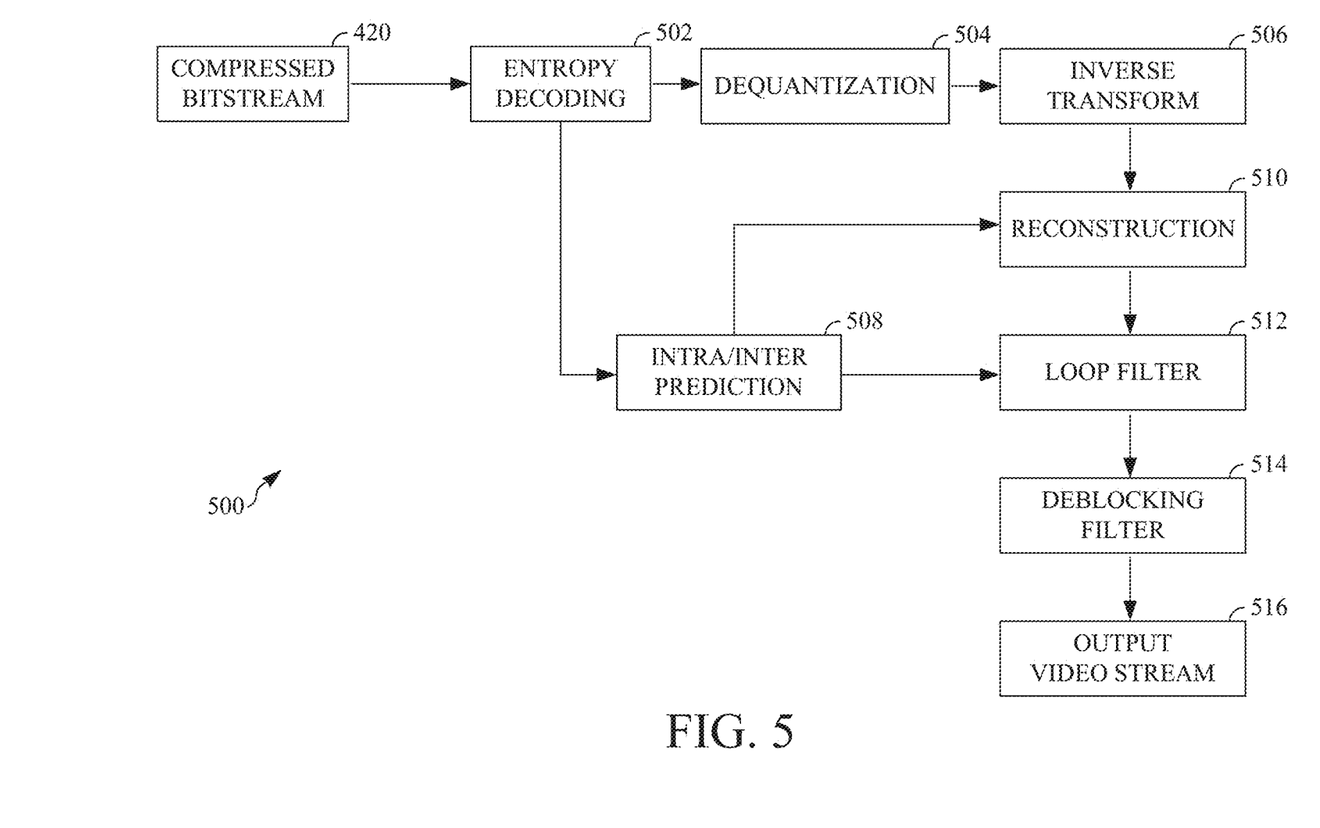
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. Implementations for forming a same prediction block as was created in the encoded 400 using masked compound prediction from multiple reference frames are discussed below with respect to FIGS. 6, 7, 8A, and 8B, for example. At the reconstruction stage 510, the prediction block can be added to the derivative residual to create a reconstructed block. The loop filtering stage 512 can be applied to the reconstructed block to reduce blocking artifacts, followed by the deblocking filtering stage 514. The result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514.

As mentioned, multiple reference frames can be used to obtain the motion vector(s) of a current block during inter-prediction. A block can be predicted using a single reference frame (i.e., "single prediction" using a single motion vector), or using a combination of multiple reference frames (e.g., "compound prediction" using two or more reference frames and motion vectors). In the case of compound prediction, a predictor (e.g., a prediction block) can be formed for each of the multiple reference frames, while the final prediction block can be determined as a combination of the predictors, such as an average (or weighted average) of the predictors. The choice of compound prediction can be made at the frame level, or specified for those blocks that are inter-predicted.

Each motion vector can refer to one of several available reference frames. A signal can be sent indicating that the reference frame that includes the motion vector reference is one of the available reference frames. Instead of signaling a frame identifier itself, which can be a relatively long sequence of bits, the signal can be a shorter sequence of bits that identifies the type of reference frame.

For example, a current frame may be encoded using a reference frame such as a "last frame," the adjacent frame immediately before the current frame in the video sequence. In some video coding schemes, particularly those where video frames are encoded out of order, it is desirable to include in the pool of candidate motion vectors motion information from video frames in the past or future. Encoding video frames may occur, for example, in the coding of so-called "alternate reference frames" that are not temporally neighboring to the frames coded immediately before or after them. An alternate reference frame may be a synthesized frame that does not occur in the input video stream or is a duplicate frame to one in the input video stream that is used for prediction and is generally not displayed following decoding. Such a frame can resemble a video frame in the non-adjacent future. Another example in which out of order encoding may occur is through the use of a so-called "golden frame," which is a reconstructed video frame that may or may not be neighboring to a current frame and is stored in memory for use as a reference frame until replaced, e.g., by a new golden frame.

Figure 6:
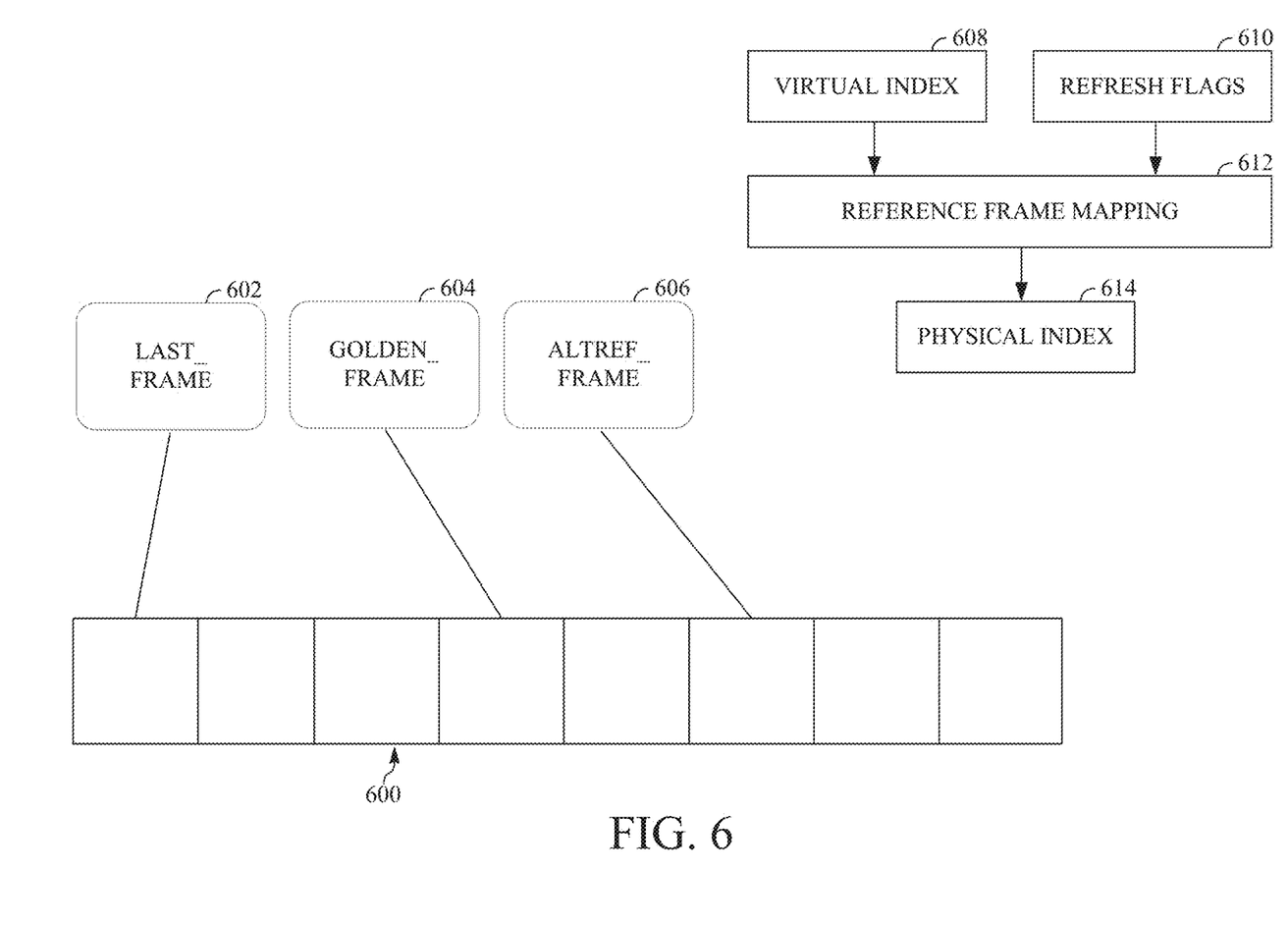
FIG. 6 is a flowchart diagram of an example of a reference frame buffer.

FIG. 6 is a block diagram of an example of a reference frame buffer 600. The reference frame buffer 600 stores reference frames used to encode or decode blocks of frames of a video sequence. The reference frame buffer 600 includes a last frame LAST_FRAME 602, a golden frame GOLDEN_FRAME 604, and an alternative reference frame ALTREF_FRAME 606. As described above, the last frame LAST_FRAME 602 can be, for example, the adjacent frame immediately before the current frame in the video sequence, which is a forward reference frame. The golden frame GOLDEN_FRAME 604 can be, for example, a reconstructed video frame for use as a reference frame that may or may not be adjacent to the current frame. The alternative reference frame ALTREF_FRAME 606 can be, for example, a video frame in the non-adjacent future, which is a backward reference frame.

The frame header of a reference frame includes a virtual index 608 to a location within the reference frame buffer 600 at which the reference frame is stored. A reference frame mapping 612 maps the virtual index 608 of a reference frame to a physical index 614 of memory at which the reference frame is stored. Where two reference frames are the same frame, those reference frames will have the same physical index even if they have different virtual indexes. One or more refresh flags 610 can be used to remove one or more of the stored reference frames from the reference frame buffer 600, for example, to clear space in the reference frame buffer 600 for new reference frames, where there are no further blocks to encode or decode using the stored reference frames, or where a new golden frame is encoded or decoded.

The reference frames stored in the reference frame buffer 600 can be used to identify motion vectors for predicting blocks of frames to be encoded or decoded. Different reference frames may be used depending on the type of prediction used to predict a current block of a current frame. For example, in bi-prediction, blocks of the current frame can be forward predicted using either the LAST_FRAME 602 or the GOLDEN_FRAME 604, or backward predicted using the ALTREF_FRAME 606. When compound prediction is used, multiple frames, such as one for forward prediction (e.g., LAST_FRAME 602 or GOLDEN_FRAME 604) and one for backward prediction (e.g., ALTREF_FRAME 606) can be used for predicting the current block.

There may be a finite number of reference frames that can be stored within the reference frame buffer 600. As shown in FIG. 6, the reference frame buffer 600 can store up to eight reference frames, wherein each stored reference frame may be associated with a different virtual index 602 of the reference frame buffer. Although three of the eight spaces in the reference frame buffer 600 are used by the LAST_FRAME 602, the GOLDEN_FRAME 604, and the ALTREF_FRAME 606, five spaces remain available to store other reference frames.

In particular, one or more available spaces in the reference frame buffer 600 may be used to store a second last frame LAST2_FRAME and/or a third last frame LAST3_FRAME as additional forward reference frames, in addition to the LAST_FRAME 602. A backward frame BWDREF_FRAME may be stored as an additional backward prediction reference frame, in addition to ALTREF_FRAME 606. The BWDREF_FRAME can be closer in relative distance to the current frame than the ALTREF_FRAME 606, for example.

The reference motion vector candidate list may be constructed as described for each reference frame associated with a previously coded block or sub-block. For example, up to six reference frames may be available for each frame as described above—e.g., LAST_FRAME 602, LAST2_FRAME, LAST3_FRAME, GOLDEN_FRAME 604, ALTREF_FRAME 606, and BWDREF_FRAME. In this case, separate reference motion vector candidate list may be constructed using those previously coded blocks or sub-blocks having motion vectors pointing each of the candidate reference frames. The last frame is updated for each frame, and the alt reference frame and golden reference frame may be updated less frequently, for example.

Although the reference frame buffer 600 is shown as being able to store up to eight reference frames, other implementations of the reference frame buffer 600 may be able to store additional or fewer reference frames. Furthermore, one or more available spaces in the reference frame buffer 600 may be used to store additional alternative reference frames (e.g., ALTREF1_FRAME, ALTREF2_FRAME, etc., wherein the original alternative reference frame ALTREF_FRAME 606 could be referred to as ALTREF0_FRAME). The ALTREF_FRAME 606 is a frame of a video sequence that is distant from a current frame in a display order, but is encoded or decoded earlier than it is displayed. For example, the ALTREF_FRAME 606 may be ten, twelve, or more (or fewer) frames after the current frame in a display order.

It is possible for BWDREF_FRAME or the additional alternative reference frames to be frames located nearer to the current frame in the display order. In one example, BWDREF_FRAME can be one frame after the current frame in the display order. In another example, a first additional alternative reference frame, ALTREF2_FRAME, can be five or six frames after the current frame in the display order, whereas a second additional alternative reference frame, ALTREF3_FRAME, can be three or four frames after the current frame in the display order. Being closer to the current frame in display order increases the likelihood of the features of a reference frame being more similar to those of the current frame. As such, one or more of the BWDREF_FRAME or additional alternative reference frames can be stored in the reference frame buffer 600 as additional options usable for backward prediction.

Figure 7:
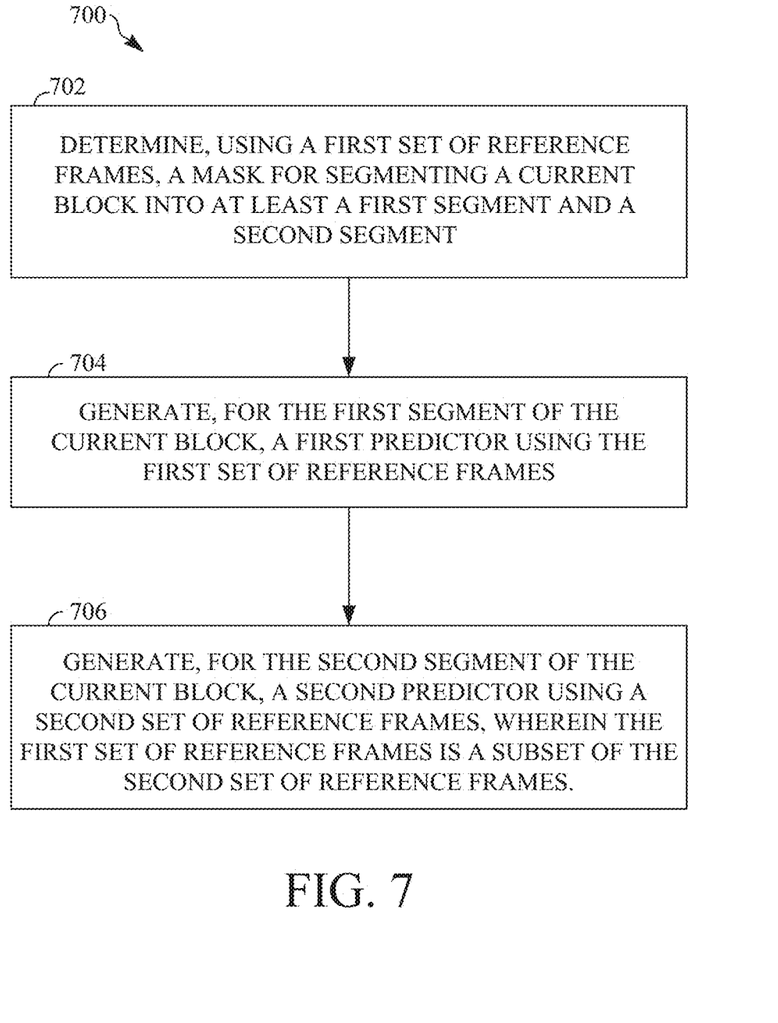
FIG. 7 is a flowchart diagram of an example process for encoding or decoding blocks of a current frame using masked compound prediction.

FIG. 7 is a flowchart diagram of a process 700 for encoding or decoding blocks of a current frame using masked compound prediction from multiple reference frames according to implementations of this disclosure. The process 700 can be implemented in an encoder such as the encoder 400 and can be implemented, for example, as a software program that can be executed by computing devices such as transmitting station 102. The process 700 can also be implemented in a decoder such as the decoder 500 and can be implemented, for example, as a software program that can be executed by computing devices such as receiving station 106. For example, the software program can include machine-readable instructions that can be stored in a memory such as the memory 204 or the secondary storage 214, and that can be executed by a processor, such as CPU 202, to cause the computing device to perform the process 700. In at least some implementations, the process 700 can be performed in whole or in part by the intra/inter prediction stage 402 of the encoder 400 or the intra/inter prediction stage 508 of the decoder 500. The process 700 can be implemented using specialized hardware or firmware. Some computing devices can have multiple memories, multiple processors, or both. The steps or operations of the process 700 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

When process 700 is implemented by a decoder such as the decoder 500, the decoder determines whether the current block was encoded using single or compound prediction. This information can be communicated by reading and decoding bits from an encoded video bitstream (e.g., compressed bitstream 420) that indicate the coding mode(s), the one or more than one motion vectors was used to encode the current block, etc. The encoded bitstream (or encoded video data) may be received by a decoder of a computing device in any number of ways, such as by receiving the video data over a network, over a cable, or by reading the video data from a primary memory or other storage device, including a disk drive or removable media such as a DVD, Compact-Flash (CF) card, Secure Digital (SD) card, or any other device capable of communicating a video stream. This information can be included in a header associated with a current block or a frame header, for example.

At 702, a mask for segmenting a current block of a current frame of the video sequence into at least a first segment and a second segment is determined, using a first set of reference frames.

The first set of reference frames can be determined, for example, based on distances between respective ones of a set of candidate reference frames identified for the current frame and the current frame of the video sequence. By tracking updates to the reference frame buffer, such as the reference frame buffer 600 in the example of FIG. 6, the encoder and the decoder can follow the same procedure to obtain the same set of reference frames. For example, the first set of reference frames can be selected from the reference frames available for the current frame in the reference frame buffer 600, such as LAST_FRAME 602, LAST2_FRAME, LAST3_FRAME, GOLDEN_FRAME 604, ALTREF_FRAME 606, and BWDREF_FRAME. The first set of reference frames can also be determined by ranking the reference frames based on, for example, popularity values or a combination of distances and popularity values.

For example, the first set of reference frames can include a pair of a forward reference frame and a backward reference frame selected from the set of candidate reference frames. Both the forward reference frame and the backward reference frame can be selected based on distances between those frames and the current frame, such as having the shortest distance in display order ("nearest") to the current frame. In one example, the pair of {LAST_FRAME, BWDREF_FRAME} can be established for coding the current frame as a bi-predictive frame. In this example, LAST_FRAME is a "nearest" forward reference frame for forward prediction, and BWDREF_FRAME is a "nearest" backward reference frame for backward prediction.

As mentioned, single or compound prediction may be selected to inter-predict the current block. When compound prediction is used, multiple, such as two, reference frames and motion vectors can be used to predict the current block. A compound prediction using masking (also referred to as "masked compound prediction") is a special type of compound prediction, where a mask is used to segment the current block into segments. For example, the current block can be segmented into a "foreground" segment and a "background" segment, based on motion characteristics. Each segment can be inter-predicted and encoded using different reference frames and motion vector combinations. It is also possible to use inter-prediction for a segment and intra-prediction for the other segment within the same block.

A mask can be determined for the current block adaptively, for example, based on motion characteristics of the video content. Determining the mask for the current block can include, for example, comparing a first prediction block with a second prediction block to determine a block of differential values, wherein the first prediction block is determined using a first frame of the first set of reference frames, and the second prediction block is determined using a second frame of the first set of reference frames. Depending on whether a corresponding value from the block of differential values (e.g., the absolute difference value) exceeds a threshold, a pixel can be assigned to a corresponding segment (e.g., the foreground segment or the background segment). For example, a threshold can be set to "5" and any pixel having an absolute difference value greater than 5 can be assigned to the foreground segment. Otherwise, the pixel is assigned to the background segment. Pixels in the background segment tend to have lower levels of motion.

Each segment can have an arbitrary shape. In one implementation, an initial mask can be determined using the techniques described above, including comparing the two prediction blocks and setting a threshold on the absolute difference values between the two prediction blocks. The initial mask can be further refined by morphological operations such as erosion and dilation to generate the final mask.

A special coding mode, such as a mask mode, can be encoded into the video bitstream for the current block without encoding the mask. The video bitstream can be compressed bitstream 420. The special coding mode can be signaled in the block header, for example. However, the mask itself does not need to be encoded. Since both the encoder and the decoder follow the same procedure as described above to derive the mask, there is no need to encode the mask itself. During decoding, the decoder can derive the mask from an encoded bitstream of the video sequence using the same set of reference frames, which are reconstructed and stored in the reference frame buffer.

Figure 8A:
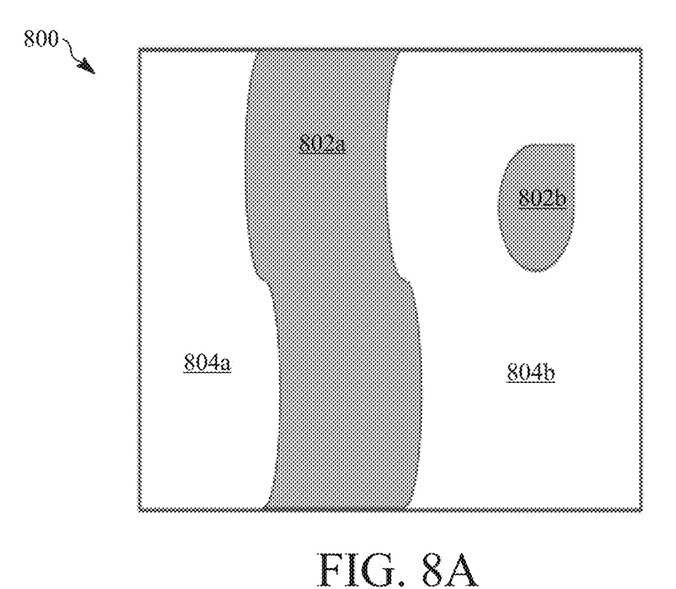
FIG. 8A is a diagram showing an example of a mask adaptively determined for a block according to an implementation.

FIG. 8A is diagram showing an example of a mask adaptively determined for a block. Compound prediction is used and the two reference frames determined for the block is the pair of {LAST_FRAME, BWDREF_FRAME}. After comparing the two prediction blocks calculated based on the two reference frames, and comparing the block of differential values with a threshold, the pixels are assigned to two segments: the foreground segment 802 (shaded areas 802*a* and 802*b*), and the background segment 804 (white areas 804*a* and 804*b*). As shown in FIG. 8A, it is possible to have a segment with disjoint areas, such as shaded areas 802*a* and 802*b*. In this example, the mask itself does not need to be explicitly signaled in the video bitstream. The mask can also be further refined using morphological operations such as erosion and dilation.

Figure 8B:
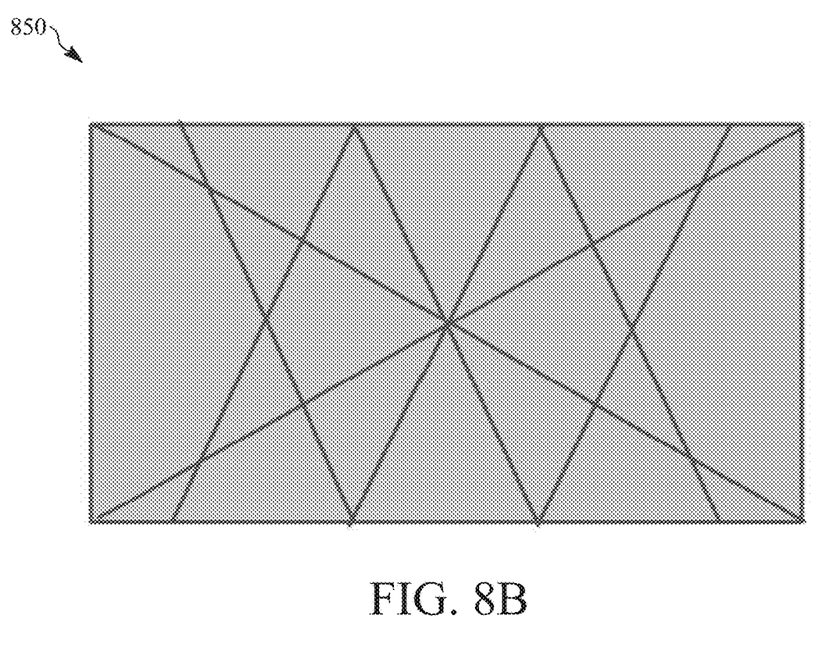
FIG. 8B is a diagram showing an example of a mask codebook available for a block according to another implementation.

The mask can also be determined using a mask codebook, which includes predetermined block segmentation patterns. FIG. 8B is a diagram showing an example of a mask codebook 850 available for a block. The mask codebook 850 includes a predetermined set of mask candidates. Both the encoder and the decoder can follow the same procedure to select/identify the same mask candidate from the mask codebook 850 for coding the current block. In this example, the code for the selected mask can be either signaled to the decoder in the video bitstream, or it can be derived based on procedures known to both the encoder and decoder.

Referring again to FIG. 7, at 704, a first predictor is generated for the first segment of the current block using the first set of reference frames. The first predictor can be generated, for example, using the first set of reference frames and the motion vectors as a result of motion search.

To further reduce overhead, the first set of reference frames, which have been used to determine the mask, can be reused to predict one or more segments determined by the mask. For example, when the pair of {LAST_FRAME, BWDREF_FRAME} is used for determining the mask, the same pair of {LAST_FRAME, BWDREF_FRAME} can be used for compound prediction of one or more segment, such as the background segment. For example, a compound predictor for the background segment can be determined by averaging the predictors generated using the pair of {LAST_FRAME, BWDREF_FRAME}. As mentioned, the first set of reference frames does not need to be explicitly encoded. Reusing the first set of reference frames for predicting one or more segments can further reduce the bits coded into the video bitstream.

At 706, a second predictor is generated for the second segment of the current block using a second set of reference frames, and the first set of reference frames is a subset of the second set of reference frames. For example, a third (or even a fourth) reference frame and a new motion vector can be searched for the second segment. This is because the first set of reference frames might not turn out to be good predictors for the second segment, especially when the second segment is a foreground segment. By using different sets of reference frames (and predictors) for different segments, the masked compound prediction adapts to the motion characteristic of the video content in the current block. The second segment can be predicted using either single prediction or compound prediction or intra-prediction, based on results of the motion search.

Other ways to generate a predictor for a segment of the mask can include, for example, using any single or combination of LAST_FRAME 602, LAST2_FRAME, LAST3_FRAME, GOLDEN_FRAME 604, ALTREF_FRAME 606, and BWDREF_FRAME to generate the predictor for that segment. In addition, other reference frames discussed in connection with FIG. 6 or other reference frames not discussed can also be used.

For simplicity of explanation, the processes 700 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding frames of a video sequence, comprising:
   determining, using a first set of reference frames, a mask for segmenting a current block of a current frame of the video sequence into at least a first segment and a second segment;
   generating, for the first segment of the current block, a first predictor using the first set of reference frames;
   generating, for the second segment of the current block, a second predictor using a second set of reference frames, wherein the first set of reference frames is a subset of the second set of reference frames;
   encoding the current block into an encoded bitstream using the first predictor and the second predictor; and
   encoding one or more bits in the encoded bitstream indicating that a coding mode of the current block is a mask mode, without encoding the mask into the encoded bitstream.

2. The method of claim 1, further comprising:
   determining the first set of reference frames based on distances between respective ones of a set of candidate reference frames and the current frame of the video sequence, wherein the set of candidate reference frames is identified for the current frame.

3. The method of claim 2, wherein the first set of reference frames comprises a pair of a forward reference frame and a backward reference frame selected from the set of candidate reference frames.

4. The method of claim 1, wherein the first predictor is a compound predictor generated using the first set of reference frames.

5. The method of claim 1, wherein determining, using the first set of reference frames, the mask for segmenting the current block of the current frame of the video sequence into at least the first segment and the second segment comprises:
   selecting, for the current block, the mask from a mask codebook comprising predetermined block segmentation patterns.

6. The method of claim 5, wherein the one or more bits indicate the mask from the mask codebook.

7. The method of claim 1, wherein determining, using the first set of reference frames, the mask for segmenting the current block of the current frame of the video sequence into at least the first segment and the second segment comprises:
   comparing a first prediction block with a second prediction block to determine a block of differential values, wherein the first prediction block is determined using a first frame of the first set of reference frames, and the second prediction block is determined using a second frame of the first set of reference frames; and
   determining the mask for the current block by assigning each pixel in the current block to a corresponding segment based on whether a corresponding value from the block of differential values exceeds a threshold.

8. A method for decoding frames of a video sequence from an encoded bitstream, the method comprising:
   decoding one or more bits from the encoded bitstream indicating that a coding mode of a current block is a mask mode, wherein a mask is not encoded into the encoded bitstream;
   determining, using a first set of reference frames, the mask for segmenting the current block of a current frame of the video sequence into at least a first segment and a second segment, wherein determining the mask comprises:
      comparing a first prediction block with a second prediction block to determine a block of differential values, wherein the first prediction block is determined using a first frame of the first set of reference frames, and the second prediction block is determined using a second frame of the first set of reference frames; and
      determining the mask for the current block by assigning each pixel in the current block to a corresponding segment based on whether a corresponding value from the block of differential values exceeds a threshold;
   generating, for the first segment of the current block, a first predictor using the first set of reference frames;
   generating, for the second segment of the current block, a second predictor using a second set of reference frames, wherein the first set of reference frames is a subset of the second set of reference frames; and
   decoding the current block from the encoded bitstream using the first predictor and the second predictor.

9. The method of claim 8, further comprising:
   determining the first set of reference frames based on distances between respective ones of a set of candidate reference frames and the current frame of the video sequence, wherein the set of candidate reference frames is identified for the current frame.

10. The method of claim 9, wherein the first set of reference frames comprises a pair of a forward reference frame and a backward reference frame selected from the set of candidate reference frames.

11. The method of claim 8, wherein the first predictor is a compound predictor generated using the first set of reference frames.

12. An apparatus for decoding frames of a video sequence from an encoded video bitstream, the apparatus comprising:
- a non-transitory memory; and
- a processor, wherein the non-transitory memory includes instructions executable by the processor to:
  - decode one or more bits from the encoded bitstream indicating that a coding mode of a current block is a mask mode, wherein a mask is not encoded into the encoded video bitstream;
  - determine, using a first set of reference frames, a mask for segmenting the current block of the current frame of the video sequence into at least a first segment and a second segment;
  - generate, for the first segment of the current block, a first predictor using the first set of reference frames;
  - generate, for the second segment of the current block, a second predictor using a second set of reference frames, wherein the first set of reference frames is a subset of the second set of reference frames; and
  - decode the current block from the encoded bitstream using the first predictor and the second predictor.

13. The apparatus of claim 12, wherein the non-transitory memory further includes instructions executable by the processor to:
- determine the first set of reference frames based on distances between respective ones of a set of candidate reference frames and the current frame of the video sequence, wherein the set of candidate reference frames is identified for the current frame.

14. The apparatus of claim 13, wherein the first set of reference frames comprises a pair of a forward reference frame and a backward reference frame selected from the set of candidate reference frames.

15. The apparatus of claim 12, wherein the first predictor is a compound predictor generated using the first set of reference frames.

16. The apparatus of claim 12, wherein the instructions executable by the processor to determine, using the first set of reference frames, the mask for segmenting the current block of the current frame of the video sequence into at least the first segment and the second segment comprise instructions to:
- compare a first prediction block with a second prediction block to determine a block of differential values, wherein the first prediction block is determined using a first frame of the first set of reference frames, and the second prediction block is determined using a second frame of the first set of reference frames; and
- determine the mask for the current block by assigning each pixel in the current block to a corresponding segment based on whether a corresponding value from the block of differential values exceeds a threshold.

* * * * *